Oct. 19, 1948.  R. S. ADAIR  2,451,705
CONTROL DEVICE FOR HYDRAULIC STEADY REST CHUCKS
Filed Sept. 29, 1947  2 Sheets-Sheet 1
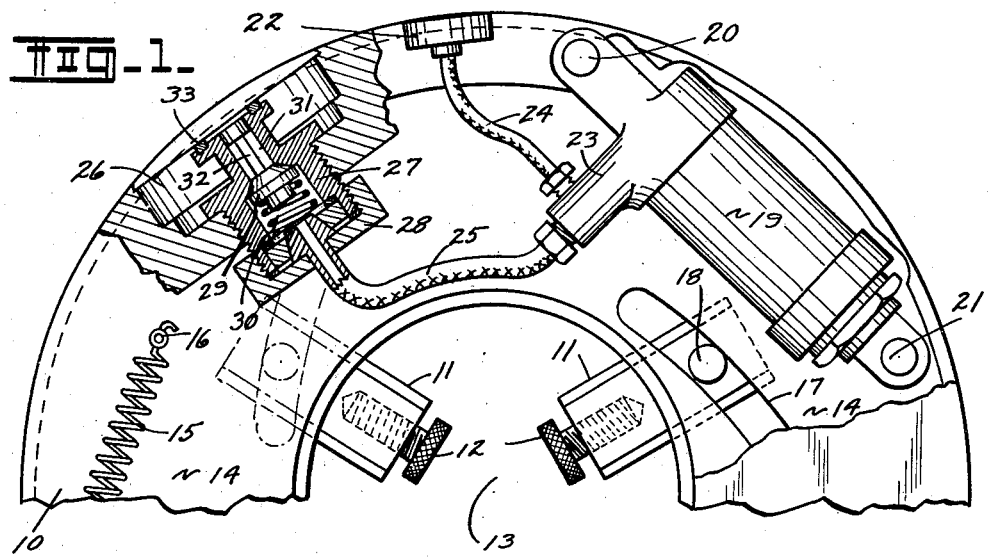
Fig. 1.
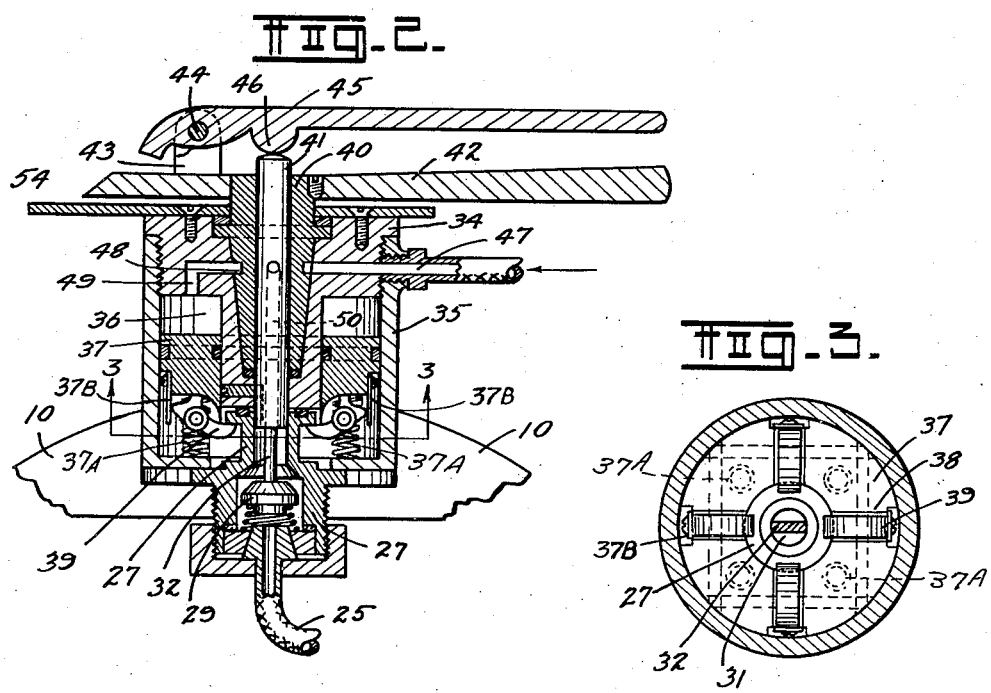
Fig. 2.
Fig. 3.
INVENTOR.
Russell S. Adair.
BY W. B. Harpman
ATTORNEY.

Oct. 19, 1948.          R. S. ADAIR          2,451,705
CONTROL DEVICE FOR HYDRAULIC STEADY REST CHUCKS
Filed Sept. 29, 1947                    2 Sheets-Sheet 2
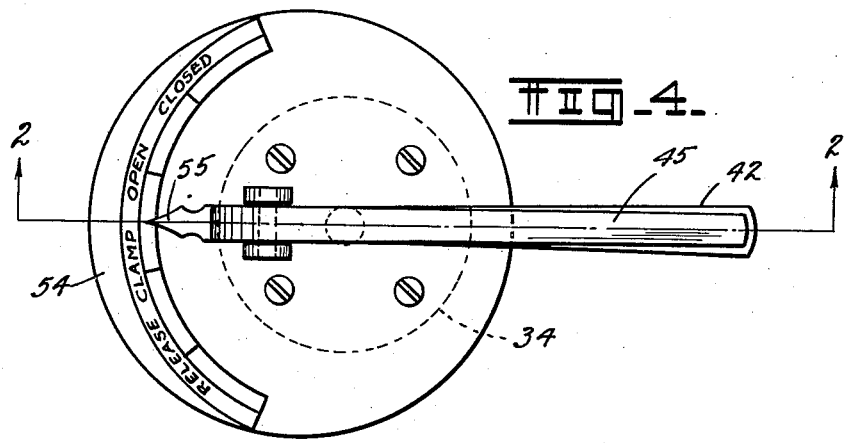
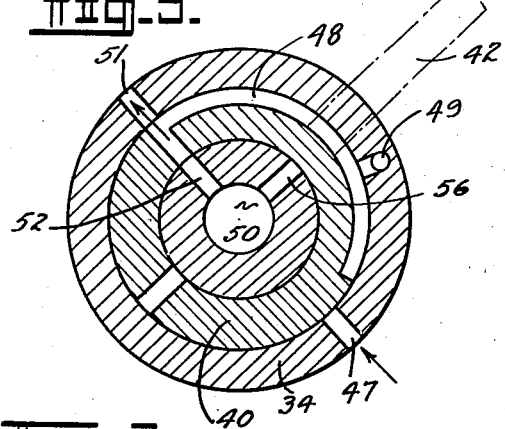
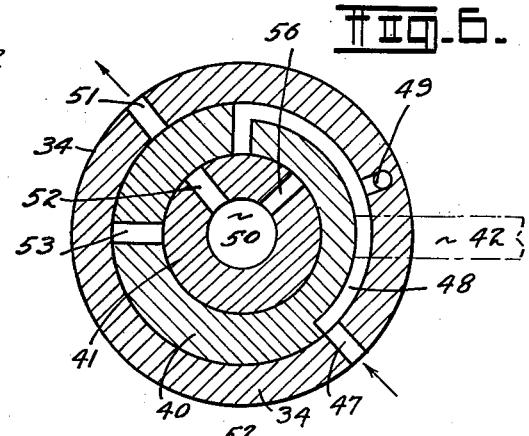
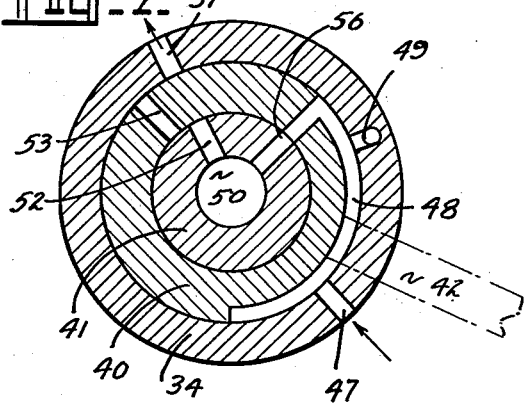
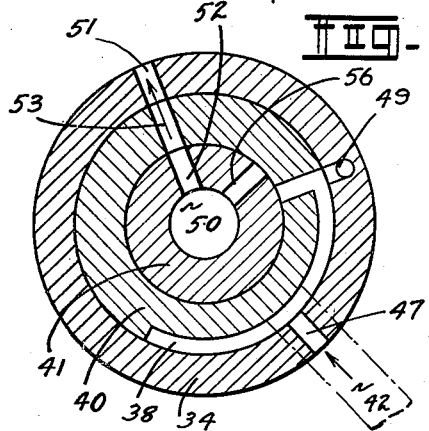
INVENTOR.
Russell S. Adair.
BY
W. B. Harpman
ATTORNEY.

Patented Oct. 19, 1948

2,451,705

UNITED STATES PATENT OFFICE 2,451,705

CONTROL DEVICE FOR HYDRAULIC
STEADY-REST CHUCKS

Russell Sandford Adair, Youngstown, Ohio

Application September 29, 1947, Serial No. 776,841

4 Claims. (Cl. 279—4)

This invention relates to steady rests and more particularly to hydraulic chuck constructions employed therewith and control means therefor.

The principal object of the invention is the provision of improved control means for hydraulic actuated steady rest chucks.

A further object of the invention is the provision of a control valve for detachable connection to a hydraulic steady rest chuck.

The principal object of the invention is the provision of improved control means for hydraulically actuated steady rest chucks.

A still further object of the invention is the provision of a hydraulic steady rest chuck having valve means therein and horizontally detachable valve means for connecting a hydraulic power source to the said chuck.

A still further object of the invention is the provision of a combination control valve for a hydraulic steady rest chuck.

The control device for hydraulic steady rest chuck shown and described herein constitutes improvements over my two co-pending patent applications, Serial No. 677,033, filed June 15, 1946, on Steady rest for a lathe, and Serial No. 738,995, filed April 2, 1947, Hydraulic steady rest chuck. In my aforesaid co-pending patent applications improved steady rest chuck constructions are disclosed and in application Serial No. 738,995 a hydraulic steady rest chuck construction is disclosed wherein hydraulic actuating pressures for operating the chuck portions of the steady rest are generated in the device by manual operation of portions thereof.

In the present disclosure means is provided for connecting an auxiliary hydraulic power source such as a compressed air line from a suitable compressed air source to the hydraulic steady rest chuck for actuating the same. The device disclosed herein comprises primarily the means for effecting the connection and controlling of hydraulic pressure introduced into the hydraulic steady rest chuck thereby. The operation of steady rest chucks on a lathe can be considerably expedited by the improvement of the invention taught herein wherein a separate power source may be connected to the steady rest of the lathe at such time as it is desired to operate the chuck portions thereof and the connecting means includes a novel control valve having a multiple valve action enabling positive and rapid control of the positioning of the chuck portions of the steady rest.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:

Figure 1 is an enlarged detailed section of a hydraulically actuated steady rest chuck with parts broken away and parts in cross section.

Figure 2 is an enlarged detailed elevation of a control valve mechanism in registry with a portion of the steady rest chuck as shown in Figure 1.

Figure 3 is a horizontal section taken on line 3—3 of Figure 2.

Figure 4 is a top plan view of the control valve shown in Figure 2.

Figure 5 is a horizontal section of the control valve shown in Figure 4 symbolically illustrating the relation and operation of the valve parts, the valve being shown in release position.

Figure 6 is a horizontal section of the control valve shown in Figure 4 symbolically illustrating the relation and operation of the valve parts, the valve being shown in clamping position.

Figure 7 is a horizontal section of the control valve shown in Figure 4 symbolically illustrating the relation and operation of the valve parts, the valve being shown in position actuating the jaws of the chuck.

Figure 8 is a horizontal section of the control valve shown in Figure 4 symbolically illustrating the relation and operation of the valve parts, the valve being shown in position causing the chuck jaws to open.

By referring to the drawings and Figure 1 in particular it will be seen that a portion of a steady rest chuck has been illustrated and indicated by the numeral 10 and that it carries a plurality of reciprocally mounted work engaging members 11 each in turn being provided with a manually adjustable tip portion 12. The reciprocally mounted work engaging members 11 are preferably positioned in a triangular pattern radially spaced about the center point of a work receiving opening 13 of the steady rest. The work engaging members 11 are positioned for reciprocal movement in the steady rest 10 and are adapted to be so moved uniformly and simultaneously by a multiple cam ring 14. The cam ring 14 is normally urged in a counterclockwise direction by means of a plurality of springs; one of which is shown in Figure 1 and indicated by the numeral 15. The spring is affixed to the multiple cam ring 14 by means of a pivot pin 16 and the other end is affixed at a point (not shown) to the steady rest 10. The cam slots illustrated in Figure 1 of the drawings are indicated by the numeral 17. It will be seen that a projection 18 formed on the adjacently positioned work engaging members 11 are positioned for registry with the slots 17 so that clockwise rotation of the multiple cam ring 14 will cause the work engaging members 11 to extend toward the center point of the work receiving opening 13 and thus into engagement with a work piece positioned therein.

Still referring to Figure 1 of the drawings it will be seen that a piston and cylinder assembly 19 is positioned in operative relation between the steady rest 10 and the multiple cam ring 14, one end of the piston and cylinder assembly being pivoted by a pivot pin 20 to the steady rest 10 and the other end of the piston and cylinder assembly 19 being pivoted by a pivot 21 to the cam ring 14. The construction of the piston and cylinder assembly is not further disclosed herein as the same is fully set forth in my hereinbefore mentioned co-pending patent application, Serial No. 738,995 wherein the telescopic arrangement of the cylindrical pistons employed are set forth. For the purpose of the present disclosure it is sufficient to point out that the pivot 21 is affixed to the piston portion of the piston and cylinder assembly and the pivot pin 20 is affixed to the cylinder portion thereof.

A gauge 22 is positioned in the periphery of the steady rest and is connected with the interior of a cylinder head 23 of the piston and cylinder assembly 19 by means of a flexible tube 24. A secondary flexible tube 25 (also connected with the interior of the cylinder head 23 of the piston and cylinder assembly 19) provides a communication channel through which fluid pressure may be introduced thereinto so as to actuate the piston and cylinder assembly 19 and hence cause the clockwise rotation of the cam ring 14 and the respective outward movement of the work engaging members 11 into the work receiving opening 13 of the steady rest. A portion of the steady rest 10 is broken away to illustrate the positioning of a recess 26 in the periphery thereof in which a valve fitting 27 is positioned in direct communication with the secondary flexible tube 25.

The valve fitting 27 is hollow and has a cap 28 positioned on its innermost end by means of which the secondary flexible tube 25 is connected thereto. A valve element 29 is positioned in the hollow interior of the fitting 27 and is normally urged to closed position by a helical coil spring 30. The uppermost portion of the valve fitting 27 forms a tubular passageway 31 through which hydraulic pressure is adapted to be introduced into the interior of the valve fitting 27 and hence through the secondary flexible tube 25 through the piston and cylinder assembly 19. An actuating rod 32 extends from the valve element 29 upwardly into the tubular passageway 31 and the upper, outermost surface of the fitting 27 is provided with a resilient gasket 33 so that a suitable connection may be established thereagainst for introducing fluid pressure into the device therethrough.

By referring to Figures 2 and 3 of the drawings a vertical and a horizontal cross section of a combination detachable fitting and control valve may be seen in operative relation to a portion of the steady rest body 10 and the valve fitting 27 thereof. The combination detachable fitting and control valve comprises a valve body 34 having a depending cylindrical skirt 35 positioned in spaced relation to a depending portion thereof so as to form an annular chamber 36 in which an annular piston 37 is positioned for vertical travel. A plurality of coil springs 37A normally urge the annular piston 37 upwardly.

A plurality of radially spaced slots 38 are formed in the lower portion of the annular piston 37 and a plurality of dogs 39 are pivoted therein so that portions of the dogs 39 may move in under the flanged upper end of the fitting 27 when other portions of the dogs 39 are moved downwardly by the annular piston 37. Leaf springs 37B are positioned on the annular piston 37 adjacent the dogs 39 and normally urge the same into position out of engagement with the flanged extension of the fitting 27.

A vertical passageway is formed in the valve body 34 of the valve, the majority of which passageway is outwardly tapered and adapted to receive a tapered plug 40. The tapered plug 40 has a vertical passageway formed therethrough and is adapted to receive a rod 41. An operating handle 42 is affixed to the uppermost end of the plug 40 and a pair of upstanding brackets 43 are positioned thereon and carry a pivot pin 44 therebetween by means of which a secondary handle 45 is affixed to the handle 42. The secondary handle 45 has a boss formed on its lowermost surface and in proximity to the upper end of the rod 41 which extends above the surface of the plug 40. The lowermost end of the rod 41 directly engages the upper end of the actuating rod 32. By referring to Figure 2 of the drawings it will be obvious that downward motion of the handle 45 will move the rod 41 downwardly through the plug 40 and thereby open the valve element 29 which is affixed to the bottom end of the actuating rod 32.

The valve body 34 has a fluid pressure inlet 47 formed therein which is adapted to be connected with a suitable source of fluid pressure such as an air compressor. The inlet 47 communicates with the tapered passageway in the valve body 34 in which the plug 40 is rotatably positioned. The plug 40 has a groove 48 which extends part way around the periphery thereof as best shown in Figure 2 and also Figures 5 through 8 of the drawings. The valve body 34 has a port 49 establishing communication between the tapered central orifice thereof and the annular chamber 36 so that when the plug 40 is turned to bring the inlet orifice 47 and the port 49 into simultaneous registry with the groove 48, fluid pressure introduced into the inlet 47 will flow around the groove 48 and the plug 40 and hence into the chamber 36 where it will move the piston 37 downwardly thereby causing the dogs 39 to move in under the flanged upstanding portion of the fitting 27 as best shown in Figure 2 whereby the valve locks itself in position thereto. In such position the handle 45 may be depressed moving the rod 41 vertically and opening the valve element 29.

The rod 41 has a vertical passageway 50 therein and as the rod 41 is held against rotation in the valve body 34, movement of the plug 40 will selectively connect the inlet orifice 47 and its communicating groove 48 in the plug 40 with the port 49 and the vertical passageway 50. When fluid pressure enters the vertical passageway 50 it flows downwardly therethrough around the actuating rod 32 and valve element 29 which may be moved into open position by the manual operation of the handle 45 as heretofore described.

The fluid pressure is thus directly connected with the flexible tube 25 and hence the piston and cylinder assembly 19 thereby causing the cam ring 14 to move in a clockwise direction which in turn causes the work engaging members 11 to move outwardly into the opening 13 in which a work piece may be positioned.

An exhaust port 51 is also formed in the valve body 34 and a pair of secondary exhaust ports 52 and 53 are formed in the rod 41 and the plug 40, respectively, so that by rotating the plug 40 the exhaust ports 51, 52 and 53 may be aligned as shown in Figure 5 whereby fluid pressure in the device may be readily exhausted to the atmosphere and the device removed from its engagement with the steady rest 10.

By referring now to Figure 4 of the drawings a top plan view of the combination detachable fitting and control valve may be seen and an indicia carrying dial 54 will be seen to be affixed to the top portion of the valve body 34 with the indicia registering beneath a pointer 55 formed on the end of the handle 42.

In Figures 5 through 8 of the drawings symbolic representations of the interior of the valve body 34 may be seen and in Figure 5 the arrangement of the several fluid passageways comprising the ports 47, the groove 48 and the ports 49, 50, 51, 52 and 53 are set in released position whereby the plug 40 closes the fluid pressure inlet 47 and inter registers with the exhaust ports 51 and 52, respectively. In addition, the groove 48 is in registry with the exhaust port 51 and the passageway 49 thereby allowing fluid pressure in the chamber 36 above the piston 37 to be vented to the atmosphere therethrough so that the valve body may be disconnected from the fitting 27 or connected thereto as the case may be.

When the valve body is connected to the fitting 27, as shown in Figure 2 of the drawings, and the handle 42 moved to the position illustrated in Figure 6, the groove 48 in the plug 40 will be placed in communication with the fluid pressure inlet 47 which will then establish communication with the port 49 and thus introduce the fluid pressure from the intake port 37 into the annular chamber 36 and thereby cause the piston to move downwardly and hence cause the dogs 39 to move into engagement beneath the flanged fitting 27 thereby locking the device in position on the steady rest body 10. In such position the handle 42 may be moved (as illustrated in Figure 7) to introduce fluid pressure from the inlet port 47 into the groove 48 in the plug 40 where it will communicate with the passageway 49 and with a passageway 56 thereby communicating with the vertical passageway 50 in the rod 41 and hence with the interior of the fitting 27. When the handle 45 is depressed the valve element 29 is opened and the fluid pressure may then pass by way of the secondary flexible tube 25 to the piston and cylinder assembly 19 to energize the mechanism as heretofore described. Such action causes the work engaging members 11 to move into the opening 13 in which the work piece is positioned.

When it is desired to release the work engaging members 11 from the work piece, the handle 42 is moved to the position shown in Figure 8 of the drawings wherein the central vertical passageway 50 in the rod 41 is brought into communication by way of the port 52 with the ports 53 and 51, respectively, thereby permitting the fluid pressure in the piston and cylinder assembly 19 to be vented directly to the atmosphere and thus permitting the spring 15 to move the cam ring 14 into counterclockwise motion and hence cause the work engaging members 11 to be retracted. It will be observed that in this position the fluid pressure from the fluid pressure inlet 47 remains in communication with the port 49 and the chamber 36 and hence continues to hold the device in locked position with respect to the steady rest body 10.

When a new work piece is positioned in the steady rest the handle 42 may be reset as shown in Figure 7 of the drawings, the work engaging members 11 thereby re-engaged with the work piece. The handle 45 is then released and the handle 42 moved to the released position shown in Figure 5 whereby the fluid pressure is evacuated from the chamber 36 and the interior of the valve body hence permitting the same to be detached from its connection to the steady rest as the valve element 29 will hold the fluid pressure in the piston and cylinder assembly 19 and thereby hold the work engaging members 11 in position on the work piece. When it is again desired to release the work piece, the valve body 34 may be re-affixed to the steady rest body 10 (as heretofore described) and the multiple valving action employed to effect the release of the pressure from the piston and cylinder assembly 19, also heretofore described.

It will thus be seen that the combination valving action obtained makes possible an interdependent attaching action on the part of the valve body 34 to the fitting 27 of the steady rest body 10 where the same may be maintained indefinitely under fluid pressure engagement therewith through the action of the dogs 39. It will also be seen that the mechanism of the steady rest may be actuated by the manipulation of the plug 40 of the valve body 34 to cause any desirable action of the steady rest work engaging mechanism as well as the attachment or release of the valve body 34 from its connection with the fitting 27.

It will be obvious to those skilled in the art that the dual valving actions are interdependent in operation in controlling the attachment of the valve body 34 to the steady rest and in controlling the mechanism of the steady rest, all as heretofore described.

Having thus described my invention, what I claim is:

1. A hydraulic steady rest chuck having movable work engaging members and a piston and cylinder assembly for actuating the same, a remote source of fluid pressure and means for detachably connecting the said remote source of fluid pressure with the said piston and cylinder assembly, said means including a fitting formed in the said hydraulic steady rest chuck and a valve body for detachable connection therewith, the said fitting being in communication with the said piston and cylinder assembly and the said valve body being in communication with the said source of fluid pressure, valve means formed in the said fitting and secondary valve means formed in the said valve body, said secondary valve means including a reciprocally positioned plunger for actuating the first mentioned valve means, and a rotary valve element for controlling the said fluid pressure applied to the said fitting.

2. The combination of a hydraulically actuated steady rest chuck and a remotely positioned source of fluid pressure and means for detachably connecting the said source of fluid pressure with the hydraulically actuated steady rest chuck, said means comprising a combination detachable connector and valve means, and including fluid pressure operated clamping means for securing the said connector and valve means unit to the said hydraulic steady rest chuck.

3. The combination of a hydraulically actuated steady rest chuck having a valved fitting thereon in communication with the actuating portions thereof and a separate source of fluid pressure and a combination coupler and valve in communication therewith, said combination coupler and valve element having means for self-engagement on the said fitting and means for actuating the said valve fitting and for controlling the said fluid pressure conveying connections established therethrough whereby the hydraulic steady rest chuck may be actuated by the said valve portion of the said combination coupler and valve.

4. Means for controlling a hydraulically actuated steady rest chuck and establishing communication between the said hydraulically actuated steady rest chuck and a separate source of fluid pressure, said means comprising a valved fitting positioned on the said hydraulic steady rest chuck and a combination coupler and rotary valve member for engagement therewith, the said device including means for securing itself to the said fitting, means for selectively operating the valved fitting and means for establishing communication channels between the said fluid pressure source and the said valved fitting, a rotary valve element for controlling the said fluid pressure so that pressure may be introduced into the said fitting or relieved therefrom and the valved fitting separately actuated therethrough.

RUSSELL SANDFORD ADAIR.

REFERENCES CITED

The following references are of record in the file of this patent:

UNITED STATES PATENTS

| Number | Name | Date |
|---|---|---|
| 33,399 | Morrison | Oct. 1, 1861 |
| 1,469,360 | Cullen | Oct. 2, 1923 |
| 1,488,221 | Swissgabel | Mar. 25, 1924 |